(12) United States Patent
Barak

(10) Patent No.: US 10,423,789 B2
(45) Date of Patent: Sep. 24, 2019

(54) IDENTIFICATION OF SUSPICIOUS SYSTEM PROCESSES

(71) Applicant: Palo Alto Networks, Inc., Santa Clara, CA (US)

(72) Inventor: Gil Barak, Raanana (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 15/477,547

(22) Filed: Apr. 3, 2017

(65) Prior Publication Data

US 2017/0286683 A1 Oct. 5, 2017

Related U.S. Application Data

(60) Provisional application No. 62/317,558, filed on Apr. 3, 2016.

(51) Int. Cl.
| | |
|---|---|
| *H04L 29/06* | (2006.01) |
| *G06F 21/56* | (2013.01) |
| *G06F 11/30* | (2006.01) |
| *G06F 21/72* | (2013.01) |
| *G06F 21/57* | (2013.01) |
| *G06F 21/55* | (2013.01) |
| *G06F 11/34* | (2006.01) |

(52) U.S. Cl.
CPC ........ *G06F 21/566* (2013.01); *G06F 11/3017* (2013.01); *G06F 11/3072* (2013.01); *G06F 11/3089* (2013.01); *G06F 11/3438* (2013.01); *G06F 21/554* (2013.01); *G06F 21/577* (2013.01); *G06F 21/725* (2013.01); *H04L 63/1425* (2013.01); *G06F 2201/835* (2013.01)

(58) Field of Classification Search
CPC ............... G06F 21/566; G06F 11/3438; G06F 11/3089; G06F 11/3017; G06F 21/554; G06F 21/577; G06F 21/725; G06F 11/3072; G06F 2201/835; H04L 63/1425
See application file for complete search history.

(56) References Cited

U.S. PATENT DOCUMENTS

| | | | |
|---|---|---|---|
| 8,108,933 B2 | 1/2012 | Mahaffey | |
| 8,181,246 B2 * | 5/2012 | Shulman | H04L 63/1416 709/245 |
| 8,234,525 B2 | 7/2012 | Dattathrani | |

(Continued)

*Primary Examiner* — Khoi V Le
(74) *Attorney, Agent, or Firm* — Gilliam IP PLLC

(57) ABSTRACT

A computerized method for identification of suspicious processes executing on an end-point device communicatively connected to network, the network communicatively connected to a server, the method comprising receiving, by the server, a record of at least one process, initiated by and executing on by the end-point device. One or more parameters associated with the at least one process are identified. A first time pointer is identified corresponding to the identified one or more parameters, a first time pointer. A second time pointer at which a user associated with the end-point device initiated a user dependent process is identified. Whether the second time pointer occurred before the first time pointer is identified. It is determined whether the at least one process was initiated by the user based on identification of user dependent processes and corresponding attribution. An action is performed based on the above determination.

17 Claims, 3 Drawing Sheets

(56) References Cited

U.S. PATENT DOCUMENTS

| | | | |
|---|---|---|---|
| 8,887,286 B2* | 11/2014 | Dupont | G06F 21/00 726/25 |
| 9,185,124 B2* | 11/2015 | Chakraborty | H04L 63/1425 |
| 9,378,367 B2* | 6/2016 | Pereira | G06F 21/554 |
| 2010/0107252 A1 | 4/2010 | Mertoguno | |
| 2012/0284790 A1* | 11/2012 | Bhargava | G06F 11/3612 726/22 |
| 2015/0149062 A1 | 5/2015 | Maza et al. | |
| 2015/0295943 A1 | 10/2015 | Malachi | |
| 2015/0319187 A1 | 11/2015 | Huang et al. | |

* cited by examiner

IDENTIFICATION OF SUSPICIOUS SYSTEM PROCESSES

CROSS-REFERENCE TO RELATED APPLICATIONS

This Application claims the benefit of co-pending U.S. Provisional Application Ser. No. 62/317,558 filed Apr. 3, 2016, the entire contents of which are incorporated herein by reference in their entirety.

BACKGROUND

1. Field

The present invention generally relates to data security, and more specifically, to a system and methods for identification of suspicious processes in a computer-based system.

2. Description of Related Art

Nowadays, as organizations and enterprises get bigger, they are more and more exposed to malicious attacks. Kaspersky® reports detections of over 300,000 different malware variants in a single day. The United Kingdom government reports over 100,000 cyber-attacks on British companies every day.

In order to identify such attacks, a number of different anti-virus applications are currently available. Such anti-virus applications force security teams of large enterprises to manage thousands of new alerts every day, when responding to a single alert may take days, weeks and sometimes months.

These applications must be deployed on a computerized environment and attempt to identify malicious activity within the network. Other solutions may also be known. For example, anti-virus solutions that detect and remove known viruses by identifying "signatures" of such viruses may be available. The majority of these solutions rely upon a basic engine that searches suspect files for the presence of predetermined virus signatures. However, these related art solutions for identifying security incidents are not effective enough and malicious activity may go undetected.

In the view of the shortcoming of related art, it would be advantageous to provide an efficient solution for detecting security incidents in a computerized environment by identifying suspicious processes in a network in an initial stage.

SUMMARY

To realize some of the advantages discussed above, there is provided a computerized method for identification of suspicious processes executing on an end-point device communicatively connected to network, the network communicatively connected to a server, the method comprising receiving, by the server, a record of at least one process, initiated by and executing on by the end-point device. One or more parameters associated with the at least one process are identified. A first time pointer is identified corresponding to the identified one or more parameters, a first time pointer. A second time pointer at which a user associated with the end-point device initiated a user dependent process is identified. Whether the second time pointer occurred before the first time pointer is identified. It is determined whether the at least one process was initiated by the user based on identification of user dependent processes and corresponding attribution. An action is performed based on the above determination.

In an enhancement, the method further comprises identifying the at least one process as a suspicious process if it is determined that the second time pointer occurred before the first time pointer the at least one process was not initiated by the user. Further an alarm is generated corresponding to the identification of the suspicious process.

In a more specific enhancement, the alert is displayed on a display unit of at least one of: an end-point device, a computerized general control system, an enterprise control system.

In yet another specific enhancement, the method comprises continuously monitoring the suspicious process.

In still another specific enhancement, the method further comprises continuously monitoring the at least one process.

Another aspect of the teachings is an apparatus for identification of suspicious processes executing on an end-point device, comprising an interface to an enterprises' system, a mining unit for identification of at least one process initiated in the enterprise's system, a processing unit and a memory coupled to the processing unit, the memory contains therein instructions that when executed by the processing unit configures the apparatus to identify suspicious processes. The processing unit receives a record of the at least one process, the process initiated by and executing on the end-point device. The processing unit identifies one or more parameters associated with the at least one process and identifies a first time pointer at which the at least one process was initiated based on the one or more parameters. The processing unit identifies a second time pointer at which a user associated with the end-point device initiated a user dependent process and further determines whether the second time pointer occurred before the first time pointer. The processing unit determines whether the at least one process was initiated by the user and takes appropriate action.

In an enhancement, a process that was initiated after the initiation of the user dependent process and was not initiated by the user is identified to be a suspicious process and an alert corresponding to the identification of the suspicious process is generated.

In another enhancement, the alert is displayed on a display unit of at least one of: an end-point device, a computerized control system, an enterprise control system.

In yet another enhancement the apparatus further comprises a data storage unit.

In still another enhancement, the identified data associated with suspicious process is stored in the data storage unit.

In yet another enhancement, the at least one process is monitored continuously.

In still another enhancement, the suspicious process is continuously monitored.

Yet another aspect of the disclosed teachings is a computer program product including a computer readable medium comprising computer executable program recorded on a computer readable non-transitory storage medium, said computer executable program code when executed causing a computer to implement the methods discussed above.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
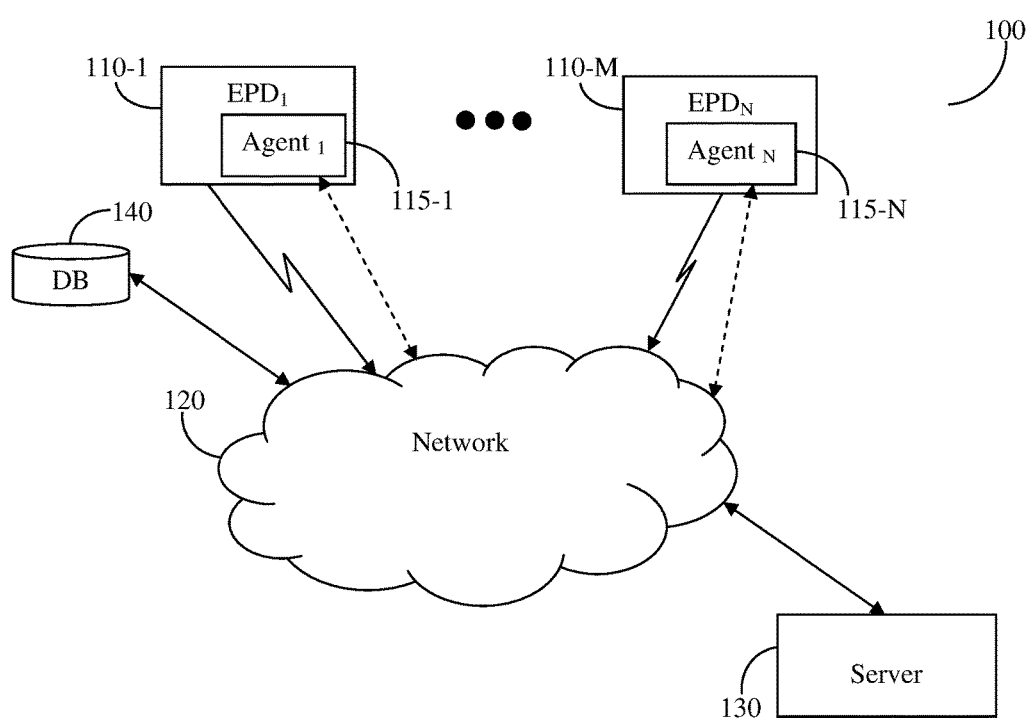
FIG. 1—is a block diagram of a network system used to describe the operation of the system according to an embodiment.

It is important to note that the embodiments disclosed herein are only examples of the many advantageous uses of the disclosed teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

This disclosure teaches a system and methods thereof for identification of suspicious processes in a computer-based system. The system receives a record of at least one process in the computer-based system. The system identifies one or more parameters associated with the process, e.g., type of process, its creator, source, etc. Based on the identification, the system differentiate between processes initialized prior to and after a user's dependent process. The system then determines whether the at least one process was initiated by a user upon determination that the user's intervention was initiated prior to the process. According to one embodiment, the system is further configured to provide an alert respective of an identification of a suspicious process.

FIG. 1 depicts an exemplary and non-limiting block diagram used to describe the operation of the system 100 according to an embodiment. A plurality of end-point devices (EPD) 110-1 through 110-M (collectively referred hereinafter as end-point devices 110 or individually as an end-point device 110, merely for simplicity purposes), where M is an integer equal to or greater than 1, are communicatively connected to an enterprise's network 120. The EPDs 110 can be, but are not limited to smart phones, mobile phones, laptops, tablet computers, wearable computing devices, personal computers (PCs), a combination thereof and the like. A plurality of agents 115-1 through 115-N installed on the EPDs 110, are further connected to the network 120. The network 120 can be a local area network (LAN), wide area network (WAN), metro area network (MAN), the worldwide web (WWW), the Internet, as well as a variety of other communication networks, whether wired or wireless, and in any combination, that enable the transfer of data between the different elements of the system 100.

A server 130 is further connected to the network 120. The server 130 is configured to identify and record processes initiated by one or more of the EPDs 110. A Process may be initiated by a boot of the EPD 110 and then referred to as a process, or initiated by a user associated with the EPD 110 and then referred to as a user dependent process. The server 130 is configured to identify a first time pointer at which at least one process was initiated in the network 120 by the EPD 110 and continuously monitoring the at least one process operation. The server 130 is further configured to identify a second time pointer at which the user dependent process was initiated. The server 130 is further configured to determine whether the at least one process was initiated by a user associated with an EPD 110 upon determination that the second time pointer occurred before the first time pointer. The determination that a process was initiated after the user dependent process was initiated, and that the user did not start the process, enables the server 130 to identify a suspicious process as further described herein below. A database 140 is also communicatively connected to the network 120. The database 140 is coupled to the server 130 and configured to store therein data associated with processes initiated by the end-point devices 110 in the network 120.

According to an embodiment the server 130 receives a record of at least one process initiated by the EPD 110. The server 130 then identifies one or more parameters associated with the at least one process. The parameters may be for example, type of process, its creator, source, etc. The parameters may indicate whether the at least one process is a familiar process, file, etc., or whether the at least one process is an unfamiliar process. That is to say, whether the at least one process is registered in a list of authorized processes, files, etc., or not. The server 130 then identifies, corresponding to the identified one or more parameters, a first time pointer at which the at least one process was initiated. The server 130 then identifies a second time pointer at which a user associated with the EPD 110, initiated a user dependent process. The identification of the second time pointer is achieved based on identification of an operation made by the user. A user dependent process is a procedure being initiated by a user in an active way, i.e., subject to a query received by a user. The query may be received, for example, by a user's gesture via an interface of the EPD 110, for example, clicking twice on an icon that launches a software.

The server 130 then determines whether the second time pointer occurred before the first time pointer. In case the second time pointer occurred before the first time pointer, the server 130 determines whether the at least one process was initiated by the user associated with the EPD 110. The determination is enabled based on the identification of the user dependent process and determining its corresponding attribution. Upon determination that the first time pointer occurred after the second time pointer, and that the at least one process was not initiated by the user, the at least one process is marked by the server 130 as a suspicious process. That is to say, in case the user dependent process initiated prior to the at least one process, and the at least one process was not initiated by the user associated with the EPD 110, the server 130 identifies the process as a suspicious process. According to another embodiment, the server 130 compares the parameters of the at least one process to one or more records of authorized processes stored in at least one list of authorized processes, files, etc. The comparison enables the server 130 to determine whether the at least one process is an authorized or unauthorized process. According to another embodiment, based on the determination that the at least one process is an unauthorized process, that the second time pointer occurred before the first time pointer, and that the at least one process was not initiated by the user, the server 130 categorizes the at least one process as a suspicious process.

According to one embodiment, the server 130 is configured to generate an alert corresponding to the identified suspicious process. The alert may be displayed on a display unit (not shown) of at least one of: the EPD 110, a computerized control system, an enterprise control system, etc. According to one embodiment the server 130 is configured to continuously monitor the at least one process and alert upon identification of a suspicious process. According to yet another embodiment the server 130 is further configured to continuously monitor the identified suspicious process, and alert upon identification of changes occurring in the identified suspicious process. That is to say, after a suspicious process was identified, and a corresponding alert was sent, the system 100 continuously monitors the suspicious process in order to identify changes in the suspicious process. An identified data associated with the operation of the system 100 may be stored within the database 140.

Figure 2:
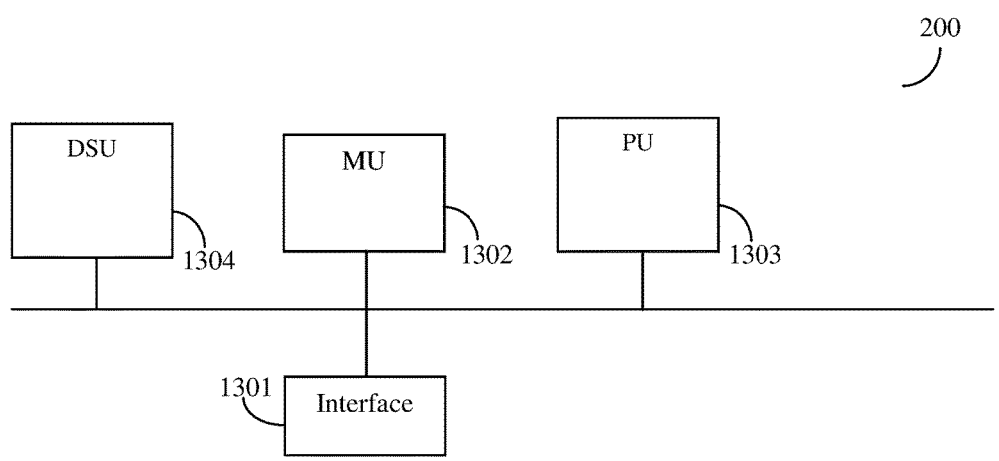
FIG. 2—is a schematic diagram of an apparatus used to describe the operation of the system according to an embodiment.

FIG. 2 is an exemplary and non-limiting schematic diagram 200 of the server 130 according to an embodiment. The server 130 includes an interface 1301 to the network 120 by which the server 130 sends and receives data over the network 120. The server 130 further includes a mining unit (MU) 1302 by which the server 130 identifies a first time pointer at which at least one process was initiated through the network 120 by one or more EPDs 110 as further described hereinabove. The MU 1302 is further configured to enable the server 130 to identify a second time pointer at which a user associated with the EPD 110 initiated a user dependent process.

A processing unit (PU) 1303 then determines whether the second time pointer occurred before the first time pointer. In case the second time pointer occurred before the first time pointer, the PU 1303 determines whether the at least one process was initiated by a user associated with the EPD 110, and if the at least one process was not initiated by the user, the PU 1303 identifies the at least one process as a suspicious process. According to an embodiment, the server 130 may further includes a data storage unit (DSU) 1304 for storing the identified data associated with the operation of the server 130. According to yet another embodiment, upon identification of at least one suspicious process, the PU 1303 may generate an alert as further described hereinabove.

Figure 3:
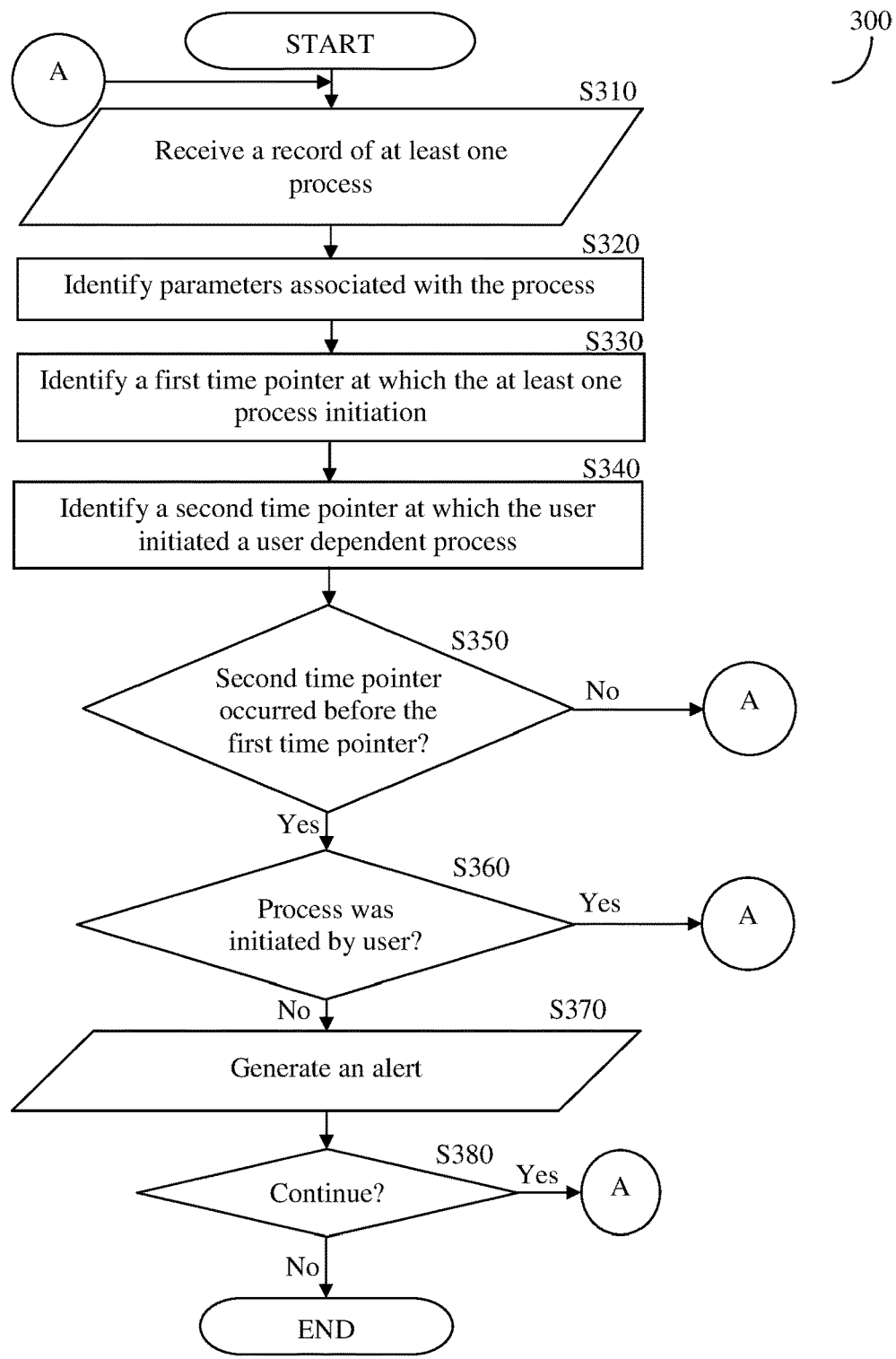
FIG. 3—is a flowchart describing a method for identification of anomalies in system processes' behavior according to an embodiment.

FIG. 3 is an exemplary and non-limiting flowchart 300 describing a method for identification of suspicious processes' according to an embodiment. In S310, the operation starts when the server 130 receives via the network 120 a record of at least one process, executed on an EPD 110, and initiated by the EPD 110. In S320, the server 130 identifies one or more parameters associated with the at least one process as further described hereinabove. In S330, the server identifies a first time pointer at which the at least one process was initiated. In S340, the server 130 identifies a second time pointer at which a user associated with the EPD 110 initiated a user dependent process.

In S350, the server 130 determines whether the second time pointer occurred prior to the first time pointer and if so, the operation continues with S360, otherwise; the operation continues with S310. In S360, the server 130 determines whether the process associated with the first time pointer was initiated by the user associated with the EPD 110, and if so the operation continues with S310, otherwise; the operation continues with S370. In S370, the server 130 generates and sends an alert to at least one of: the EPD 110, a computerized control system, an enterprise control system, etc., corresponding to the identification of the at least one process as a suspicious process. In S380, it is checked whether to continue the operation and if so the execution continues with S310; otherwise, the execution terminates.

The principles of the disclosed teachings are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the invention may be achieved without departing from the scope of the disclosed invention. All such embodiments are included herein. The scope of the invention should be limited solely by the claims thereto.

What is claimed is:

1. A method comprising:
    based on receipt of a record of at least a first process executing on a first end-point device in an enterprise network, identifying a set of one or more parameters associated with the first process;
    identifying, corresponding to the identified set of one or more parameters, a first time pointer at which the first process was initiated;
    identifying a second time pointer at which a second process was initiated on the first end-point device by a first user associated with the first end-point device;
    determining that the second time pointer occurred before the first time pointer and that the first process was not initiated by the first user based, at least in part, on the set of one or more parameters;
    determining that the first process is registered in a list of authorized processes for the enterprise network;
    identifying the first process as a suspicious process based, at least in part, on the determinations that the second time pointer occurs prior to the first time pointer, that the first process is not registered in the list of authorized processes, and that the first process was not initiated by the first user; and
    generating an alert corresponding to identification of the first process as a suspicious process.

2. The method of claim 1, wherein the alert is displayed on a display unit of at least one of: an end-point device, a computerized general control system, an enterprise control system.

3. The method of claim 1, further comprising continuously monitoring the first process after identifying the first process as a suspicious process.

4. The method of claim 1, further comprising:
    generating a second alert if a change is detected while continuously monitoring the first process.

5. The method of claim 1 further comprising receiving, at a server in the enterprise network, the record from an agent installed on the first end-point device.

6. An apparatus comprising:
a processing unit;
a memory coupled to the processing unit, the memory storing therein instructions that when executed by the processing unit cause the apparatus to,
based on receipt of a record of a first process executing on a first end-point device in an enterprise network, identify a set of one or more parameters associated with the first process and identify a first time pointer at which the first process was initiated on the first end-point device based, at least in part, on the set of one or more parameters;
identify a second time pointer at which a first user associated with the first end-point device initiated a second process;
determine whether the second time pointer occurred before the first time pointer;
based on a determination that the second time pointer occurred before the first time pointer, determine whether the first user initiated the first process;
determine whether the first process is registered in a list of authorized processes for the enterprise network; and
based on determinations that the second time pointer occurred before the first time pointer, that the first process is not registered in the list of authorized processes, and that the first user did not initiate the first process, identify the first process as suspicious.

7. The apparatus of claim 6, wherein the memory further has stored therein instructions executable by the processing unit to cause the apparatus to generate an alert corresponding to the identification of the first process as a suspicious process.

8. The apparatus of claim 7, wherein instructions to generate the alert comprise instructions executable by the processing unit to cause the apparatus to display the alert on a display unit of at least one of: an end-point device, a computerized control system, an enterprise control system.

9. The apparatus of claim 6 further comprising a data storage unit, wherein memory further stores instructions executable by the processing unit to cause the apparatus to store data associated with the suspicious process in the data storage unit.

10. The apparatus of claim 6 wherein the memory further stored instructions executable by the processing unit to cause the apparatus to continuously monitor the first process based on identification of the first process as a suspicious process.

11. The apparatus of claim 6 further comprising a network interface, wherein the memory further stores instructions executable by the processing unit to cause the apparatus to receive the record from an agent installed on the first end-point device.

12. The apparatus of claim 6 wherein the memory further stores instructions executable by the processing unit to cause the apparatus to determine whether the first process is registered in a list of authorized processes for the enterprise network, wherein the instructions to identify the first process as suspicious is also based on a determination that the first process is not registered in the list of authorized processes.

13. A non-transitory computer-readable medium having stored therein computer program code executable to:
based on receipt of a record of a first process executing on a first end-point device, identify a set of one or more parameters associated with the first process and identify a first time pointer at which the first process was initiated on the first end-point device based, at least in part, on the set of one or more parameters;
identify a second time pointer at which a first user associated with the first end-point device initiated a second process;
determine whether the second time pointer occurred before the first time pointer;
based on a determination that the second time pointer occurred before the first time pointer, determine whether the first user initiated the first process;
determine whether the first process is registered in a list of authorized processes for the enterprise network; and
based on determinations that the second time pointer occurred before the first time pointer, that the first process is not registered in the list of authorized processes, and that the first user did not initiate the first process, identify the first process as suspicious.

14. The non-transitory computer-readable medium of claim 13, further having stored therein computer program code executable to generate an alert corresponding to the identification of the first process as a suspicious process.

15. The non-transitory computer-readable medium of claim 14, wherein the computer program code to generate the alert comprises computer program code executable to display the alert on a display unit of at least one of: an end-point device, a computerized control system, an enterprise control system.

16. The non-transitory computer-readable medium of claim 13 further having stored therein computer program code to continuously monitor the first process based on identification of the first process as a suspicious process.

17. The non-transitory computer-readable medium of claim 13 further having stored therein computer program code executable to receive the record from an agent installed on the first end-point device.

* * * * *